United States Patent [19]

Oba et al.

[11] Patent Number: 5,615,956
[45] Date of Patent: Apr. 1, 1997

[54] ROLLER BEARING

[75] Inventors: Fumio Oba, Iwata-gun; Toshihiko Matsushima, Iwata; Hitoshi Murakami, Iwata-gun; Tomoaki Terada, Iwata, all of Japan

[73] Assignee: NTN Corporation, Osaka, Japan

[21] Appl. No.: 712,674

[22] Filed: Sep. 13, 1996

Related U.S. Application Data

[63] Continuation of Ser. No. 388,835, Feb. 15, 1995, abandoned.

[30] Foreign Application Priority Data

Feb. 28, 1994 [JP] Japan ................................. 6-029405

[51] Int. Cl.⁶ .......................... F16C 33/66; F16C 33/56
[52] U.S. Cl. ........................ 384/470; 384/463; 384/572
[58] Field of Search .................................. 384/463, 470, 384/572, 576, 527

[56] References Cited

U.S. PATENT DOCUMENTS 3,135,564 6/1964 Agens ................................. 384/463 X
4,492,415 1/1985 Baile et al. ............................ 384/463
4,534,871 8/1985 Johnson ............................. 384/463 X Primary Examiner—Thomas R. Hannon
Attorney, Agent, or Firm—Nikaido, Marmelstein, Murray & Oram LLP

[57] ABSTRACT

A roller bearing includes an outer ring having a raceway formed on its inner periphery, a plurality of rollers arranged along the raceway at predetermined intervals, and a solid lubricant filling the spaces between the adjacent rollers. The rollers and the solid lubricant form a one-piece body. The problems of large friction between rollers and the skewing of rollers are solved and it is possible to increase the load-bearing capacity of the bearing by using a large number of longer rollers.

1 Claim, 2 Drawing Sheets

ROLLER BEARING

This application is a continuation of application Ser. No. 08/388,835 filed Feb. 15, 1995, now abandoned.

BACKGROUND OF THE INVENTION

This invention relates to a roller bearing.

FIGS. 4 to 6 show conventional shell type needle roller bearings. The one shown in FIG. 4 has a cage 2. A plurality of needle rollers 3 are arranged in the outer ring 1 along a raceway formed on inner periphery thereof, kept apart a predetermined distance from each other by the cage 2.

The one shown in FIG. 5 is a full type roller bearing. Its rollers 3 are arranged circumferentially close to each other. Grease filling the space between the rollers serves to keep the rollers on the inner periphery of the outer ring 1 by its adhesive force, preventing the rollers from dropping out.

The bearing shown in FIG. 6 is another full type bearing. Its outer ring 1 has inwardly bent portions 4 at both ends to prevent the rollers 3 from dropping out.

Since the bearing shown in FIG. 4 has the cage 2 for guiding the rollers 3, its maximum revolving speed is high and its rollers 3 will never skew. But due to the very presence of the cage, it is difficult to increase the number of rollers used and their length and thus to increase the load-bearing capacity of the bearing. Namely, in order to increase both the number of rollers used and their length, the cage has to have a larger number of pockets. Such a cage is not only difficult to manufacture and thus costly but it is also very fragile.

Problems of the full type bearings are that a rather large friction is produced between the rollers and that the rollers are skewed very easily. Thus, their use is limited. Another problem of the bearing that uses grease to hold the roller in position is that the rollers 3 tend to drop out when handling the bearing.

It is therefore an object of this invention to solve the problems of conventional full type roller bearings, including the problems of large friction between rollers and the skewing of rollers, and to increase the load-bearing capacity of the bearing by using a larger number of longer rollers than those of a conventional cage-carrying bearing.

SUMMARY OF THE INVENTION

In order to achieve this object, the present invention provides a roller bearing comprising an outer ring having a raceway formed on inner periphery thereof, a plurality of rollers arranged in the outer ring along the raceway at predetermined intervals, and a solid lubricant filling the spaces between the adjacent ones of the rollers, the rollers and the solid lubricant forming a one-piece body.

The solid lubricant acts like a bearing cage. It serves to maintain the distance between the adjacent rollers and their positions. Also, its oil content lubricates the rollers.

According to the present invention, the spaces between the adjacent rollers arranged at predetermined intervals are filled with a solid lubricant so that the solid lubricant and the rollers form an integral body. Since the solid lubricant serves as a bearing cage, the rollers will never be abraded against each other nor will be skewed unlike conventional full type roller bearings. It is also possible to minimize the intervals between the adjacent rollers. Further, unlike a conventional bearing cage, the solid lubricant scarcely limits the number of rollers used and their length. Thus, it is possible to increase the load-bearing capacity of the bearing by increasing the number of rollers used.

Other features and objects of the present invention will become apparent from the following description made with reference to the accompanying drawings, in which:

DETAILED DESCRIPTION OF THE PREFERRED EMBODIMENT

Figure 1:
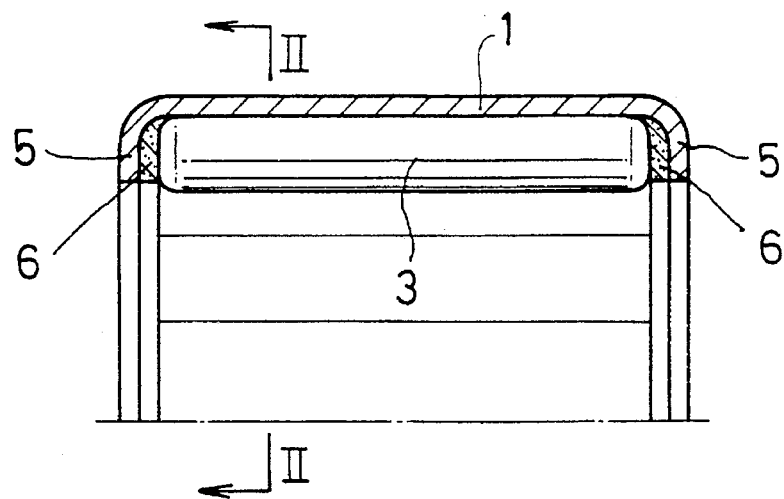
FIG. 1 is a partial sectional view of a first embodiment.
Figure 2:
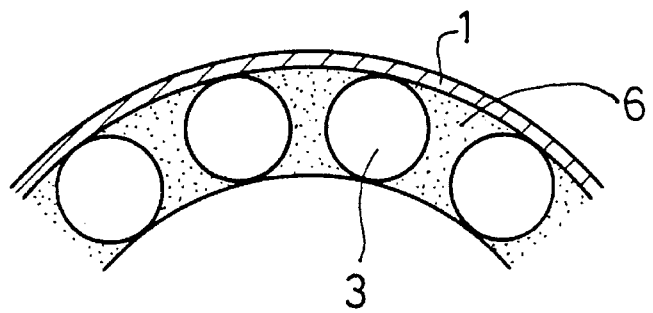
FIG. 2 is an enlarged sectional view taken along line II—II of FIG. 1.

The first embodiment shown in FIGS. 1 and 2 is a shell type needle roller bearing. It includes a shell type outer ring 1 formed with a raceway on the inner periphery thereof. A plurality of needle rollers 3 are arranged along the raceway at equal intervals. Both ends of the outer ring 1 are bent inwards to form flanges 5.

The spaces between the adjacent rollers 3 and the spaces between the end faces of the rollers and the flanges 5 are filled with a solid lubricant 6, which serves as a kind of cage which maintains the intervals between the adjacent rollers and their position. By use of a suitable jig, it is preferable to mount as large a number of rollers as possible as far as the adjacent rollers can be kept apart from each other.

The solid lubricant 6 used is one known by the name of "plastic grease". It is a lubricating composition in the form of a mixture of an ultra-high-molecular-weight polyolefine and a grease. More specifically, after arranging the rollers 3 at predetermined distances with a jig, the spaces between the rollers are filled with a mixture of 95–1 wt % of an ultra-high-molecular-weight polyethylene having an average molecular weight of $1 \times 10^6$ –$5 \times 10^6$ and 5–99 wt % of a lubricating grease having a dropping point higher than the gelation temperature of the ultra-high-molecular-weight polyethylene. Thereafter, this mixture is heated to a temperature higher than the gelation temperature of the ultra-high-molecular-weight polyethylene and then cooled to harden (see Examined Japanese Patent Publication 63-23239).

Alternatively, the lubricant 6 may be one formed by mixing 95–1 wt % of an ultra-high-molecular-weight polyolefin having an average molecular weight of $1 \times 10^6$–$5 \times 10^6$ and a particle diameter of 1–100 µm into 5–99 wt % of a lubricating grease having a dropping point higher than the gelation temperature of the said ultra-high-molecular-weight polyolefin, and dispersing and holding the mixture at a temperature higher than the gelation temperature.

In either case, an additive for preventing the bleeding of solid wax or other oil component may be added.

A high-rigidity type solid lubricant may be used to increase the strength of the lubricant as the cage. Also, an oil lubricant may be added. Since the rising speed of the bearing temperature is largely dependent upon such oil lubricant, the bearing can be used at higher revolving speeds.

Figure 3:
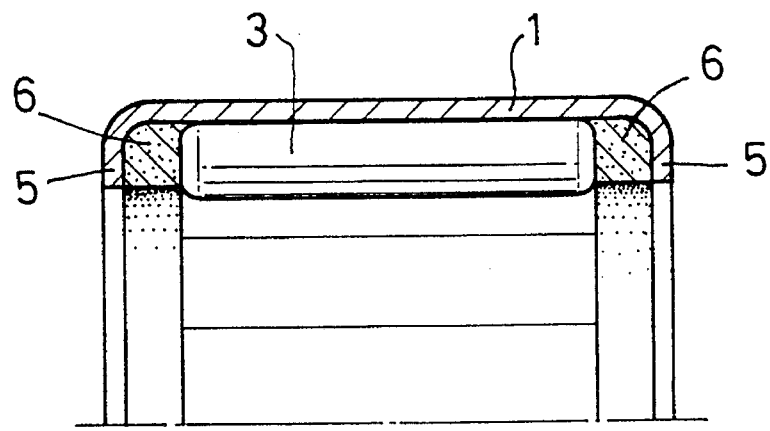
FIG. 3 ms a partial sectional view of a second embodiment.
Figure 4:
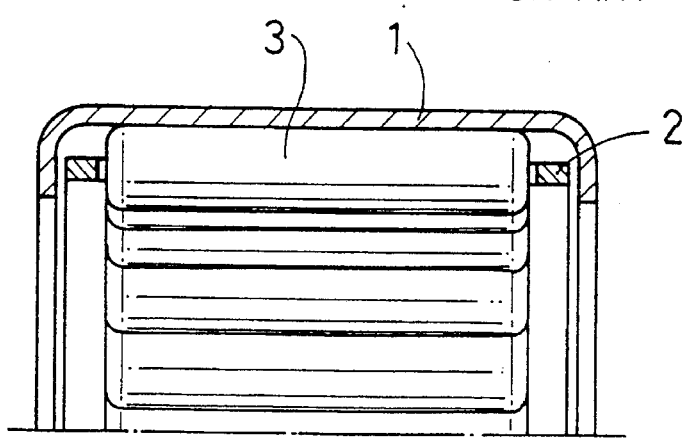
FIG. 4 is a partial sectional view of a conventional roller bearing.
Figure 5:
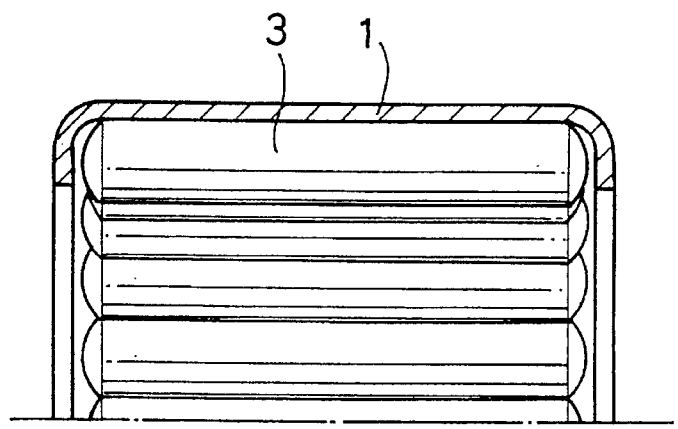
FIG. 5 as a partial sectional view of another conventional roller bearing.
Figure 6:
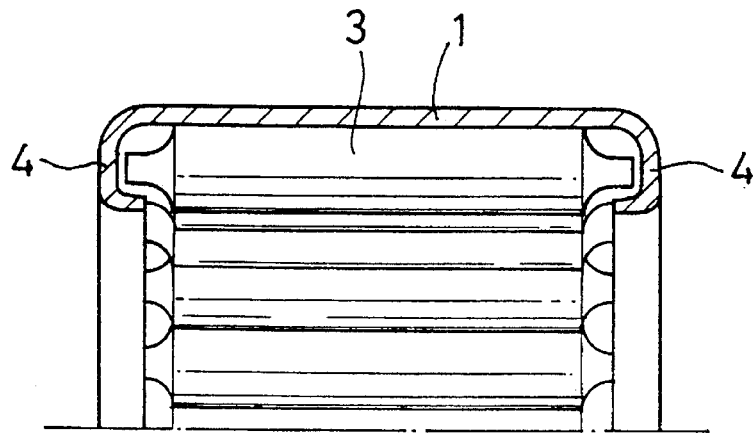
FIG. 6 is a partial sectional view of still another conventional roller bearing.

In the first embodiment, the rollers 3 have a length substantially equal to the width of the raceway of the outer ring 1. The rollers 3 in the second embodiment shown in FIG. 3 are shorter than those of the first embodiment. Namely, they are of substantially the same length as or slightly longer than those of a conventional bearing having a cage. With this arrangement, it is possible to increase the strength of the solid lubricant as the bearing cage. Otherwise, this embodiment is the same as the first embodiment.

In the embodiments, we showed and described only needle roller bearings. But the concept of the invention is equally applicable to cylindrical roller bearings.

What is claimed is:

1. A roller bearing comprising an outer ring having a raceway formed on an inner periphery thereof, axial ends, and radially inwardly bent flanges at both axial ends, a plurality of rollers arranged in said outer ring along said raceway at predetermined intervals, lubricant gaps defined between outside surfaces of adjacent rollers and between both ends of each of said plurality of roller and inner surfaces of said flanges and a solid lubricant comprising a mixture of an ultra-high-molecular-weight polyolefin and a grease filling the lubricant, said plurality of rollers and said solid lubricant forming a one-piece body.

* * * * *